United States Patent [19]

Gentsch et al.

[11] Patent Number: 5,052,160
[45] Date of Patent: Oct. 1, 1991

[54] TILE BOARD

[75] Inventors: Barton K. Gentsch; Thomas M. Whitney, both of Lapeer, Mich.

[73] Assignee: Trayco, Inc., Lapeer, Mich.

[21] Appl. No.: 123,487

[22] Filed: Nov. 20, 1987

Related U.S. Application Data

[63] Continuation-in-part of Ser. No. 906,326, Sep. 11, 1986, abandoned, which is a continuation-in-part of Ser. No. 575,217, Jan. 30, 1984, abandoned.

[51] Int. Cl.⁵ .................. B44F 3/00; E04F 13/00; B32B 31/30
[52] U.S. Cl. .................... 52/314; 52/309.1; 52/311; 52/384; 264/139; 428/167
[58] Field of Search ............ 52/309.1, 309.13, 311, 52/314, 316, 384, 385, 390, 557, 558; 428/47, 48, 167, 172; 264/139, 167, 171

[56] References Cited

U.S. PATENT DOCUMENTS

| | | | |
|---|---|---|---|
| 1,583,748 | 5/1926 | Reuter-Lorenzen | 264/139 |
| 1,947,271 | 2/1934 | Mattison | 427/272 |
| 2,245,468 | 6/1941 | Dussol | 52/314 |
| 2,311,590 | 2/1943 | Feder | 52/314 |
| 3,044,151 | 7/1962 | Coler | 264/139 |
| 4,221,836 | 9/1980 | Rutledge | 428/220 |
| 4,296,154 | 10/1981 | Ibberson | 428/15 |
| 4,336,012 | 6/1982 | Koch et al. | 425/376.1 X |
| 4,405,547 | 9/1983 | Koch et al. | 425/462 X |
| 4,514,449 | 4/1985 | Budich | 52/309.1 X |
| 4,540,623 | 9/1985 | Im et al. | 264/171 |
| 4,576,870 | 3/1986 | Libler | 264/171 |
| 4,585,701 | 8/1986 | Bartoszek | 264/171 |

FOREIGN PATENT DOCUMENTS 374151  6/1932  United Kingdom .............. 428/172

Primary Examiner—Richard E. Chilcot, Jr.
Assistant Examiner—Robert Canfield
Attorney, Agent, or Firm—Myron B. Kapustij; Edgar A. Zarins; Malcolm L. Sutherland

[57] ABSTRACT

A tile board made from a one piece sheet having top and bottom portions of contrasting colors. Grooves are machined through the top layer to expose strips of the bottom layer. The exposed strip divides the top layer into tile sized members which simulate inlaid tiles having beveled edges. The exposed strips of the bottom layers simulate recessed grout lines. Machining of the grooves through the top layer simultaneously forms the simulated tiles and simulated grout lines in the plastic sheet. The tile board can have a bent edge section to provide a finished tile look spanning a corner of two adjacent walls.

12 Claims, 2 Drawing Sheets

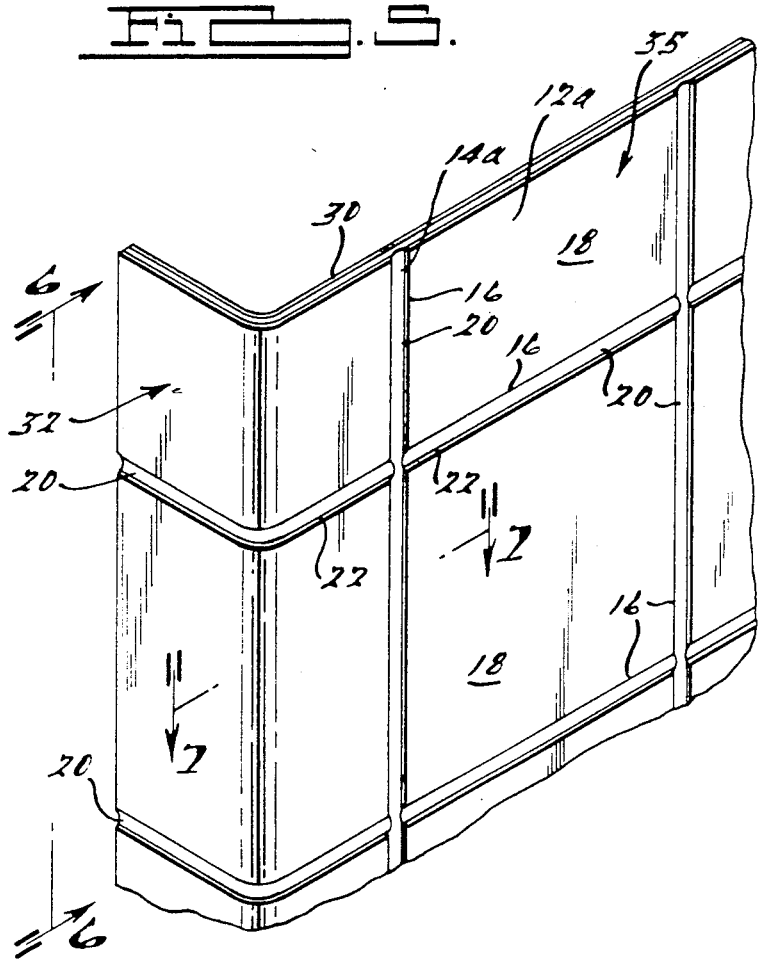
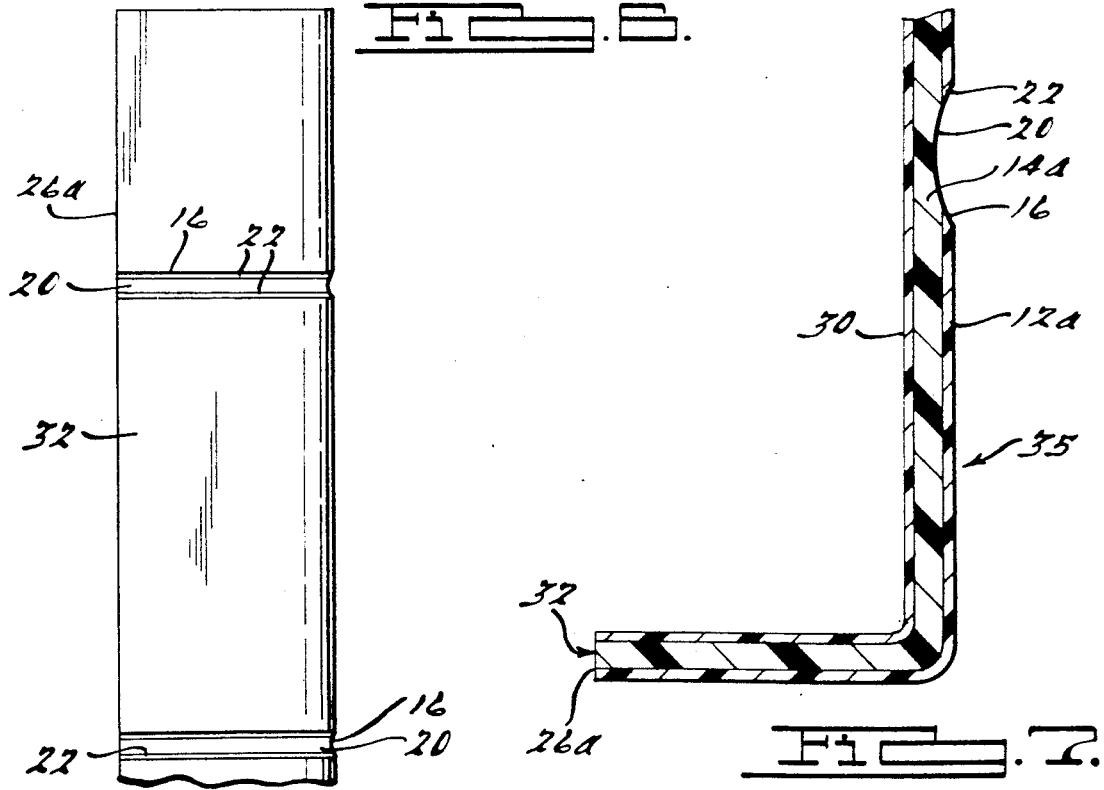

TILE BOARD

This is a Continuation-in-Part of application Ser. No. 906,326 filed Sept. 11, 1986, now abandoned, which is a Continuation-in-Part of application Ser. No. 575,217 filed Jan. 30, 1984 (now abandoned).

TECHNICAL FIELD

This invention relates to a tile board simulating tiles embedded in grout.

DISCLOSURE INFORMATION

Tiled walls have long been popular, particularly for bathrooms and kitchens. In spite of the popularity of tiled walls, these walls present problems. Firstly, the grout may become a breeding place for stain producing mildew. Once stained, the grout is extremely difficult to clean since it is porous and the stain may permeate through the grout. Secondly, the grout may crack or loosen and fall out of the spaces between the tiles. Once the grout is cracked, moisture may seep in behind the tiles and loosen them from the supporting wall. In addition, tile is difficult to install in perfectly straight lines. Lastly, tile is relatively expensive and time consuming to install compared to other walls.

Wall boards have been proposed to simulate embedded tiles. U.S. Pat. No. 1,947,271 issued to Mattison on Feb. 13, 1937 discloses a rigid sheet of asbestos and cement coated with a lacquer layer. The asbestos cement material is then scored to produce score marks. Several lacquer layers are then sequentially sprayed onto the scored material to produce a sheet tiling.

However, many genuine tiles have beveled edges. Many simulated tile sheets do not look genuine because the simulated tiles do not have thickness or a beveled edge of a rear tile. Tile sheets as disclosed in the Mattison reference lack both the thickness and beveled edge. On the other hand, simulated tiles that have the beveled edge and the appearance of thickness to the tiles are made by a complicated method.

For example, U.S. Pat. No. 2,245,468 issued to Dussol on June 10, 1941 discloses a wall board made from compressed materials such as fiber which has grooves cut therein. A cement finish is then laid into the groove so that the wall board simulates separate tiles embedded within the laid cement.

U.S. Pat. No. 2,311,590 issued to Feder on Feb. 16, 1943 discloses a wall board that includes a resin coated base sheet that has grooves formed therein. The grooves are then coated with a bonding material. An enamel layer is then placed over the whole base sheet and covers the bonding material within the groove. A differently colored enameled coating is then placed within the groove to form a plurality of simulated cement lines.

What is needed is an easily manufactured wall board made from seamless plastic material with contoured grooves cut therein to simulate embedded tile with beveled edges and recessed grout lines.

Known wall boards are flat. Rooms have walls that are perpendicular to each other forming inner and outer corners. Two wall board pieces must be secured to the wall to abut each other at a corner. For inner corners, this practice is acceptable. However, for outer corners, the resulting seam or caulk line can be unseemly and often is a distinct clue that the tiles are fake. What is needed is a wall board that eliminates the seams at the outside corners of walls by spanning the corner and being secured to both walls that form the outside corner.

SUMMARY OF THE INVENTION

In accordance with the invention, a one piece sheet of material such as plastic, has a top portion and an underlying portion (i.e. tile layer and grout layer) of contrasting color or being otherwise visually distinctive. The one piece sheet of plastic is homogeneously formed simultaneously as the two layers are placed together as a liquid and solidify together to form an integral unit. The tile board is then grooved through the top layer to expose strips of the underlying layer within the grooves. The grooves intersect to divide the top layer into tile sized components with the underlying layer exposed around each component. The tile sized components simulate individual tiles. The exposed strips of the underlying layer simulate grout lines.

Preferably the tile board is milled to form grooves with a concave surface. Preferably, the edge of each tile sized component is sloped downwardly and is continuous with the exposed strips of the underlying layer. Furthermore, the grooves are dimensioned with respect to the top and underlying layers such that the groove is substantially wider at the top edge of the top layer than at the top edge of the underlying layer. The top layer thereby simulates a tile having a beveled edge ending at the underlying layer which in turn simulates a recessed grout line. Preferably, the width at the top of the groove is approximately twice the width at the top edge of the underlying layer.

Furthermore, the depth of the groove through the top portion is preferably greater than the depth of the groove through the bottom layer of the sheet. The tile sized components thus appear to have a significant thickness.

The bottom surface of the underlying layer is preferably flat to adhere bonding of the tile board to a preexisting wall. Alternatively, an additional layer or layers of plastic can be simultaneously formed and solidified together with the top and underlying layers so that the flat bottom surface of the underlying grout layer is sandwiched between the tile layer and the additional layer or layers.

The lines of simulated grout are non-porous and there is no seam between the lines of simulated grout and the simulated tiles so that the tile board does not promote the adherence of moisture or the growth of possibly staining mold.

In one embodiment, an edge section of the tile board is bent approximately 90° to wrap around a corner of two walls. Other degrees are possible to fit non-right angle corners. The bent edge section is formed by taking a flat wall board and heating a linear section to make the plastic pliable. The wall board is then placed on a hinged plate with the hinge axis aligned under the heated linear section and clamped in place with an elongated clamp placed adjacent the heated linear section. The section of plate under the edge section is pivoted upward to bend the edge section upward to the desired angle. The wall board is released and the heated linear section is allowed to cool. The tile wall board with a bent edge section can be placed about a corner of two walls to present a finished tiled appearance.

BRIEF DESCRIPTION OF THE DRAWINGS

Reference now is made to the accompanying drawings in which:

FIG. 5 is a fragmentary perspective view of a second embodiment according to the invention;

FIG. 6 is an enlarged side elevational view taken along lines 6—6 in FIG. 5; and FIG. 7 is an enlarged sectional view taken along lines 7—7 in FIG. 5.

DETAILED DESCRIPTION OF THE PREFERRED EMBODIMENT

Figure 2:
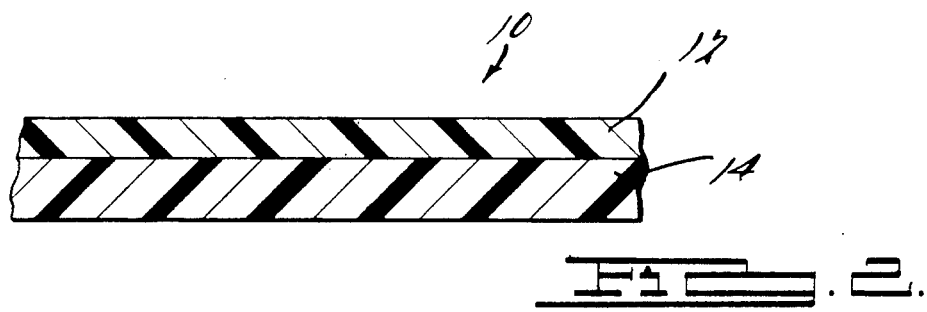
FIG. 2 is an enlarged fragmentary cross-sectional view through the tile board prior to the milling of grooves therein.

A tile board 10 has a top layer 12 and an underlying layer 14 of plastic material which are formed together as a one piece sheet. The plastic sheet can be coextruded so long as the underlying layer 14 is simultaneously formed and homogeneously bonded to the top layer 12. In other words, the top and underlying layers solidify together to form a seamless integral unit. The top and underlying layers 12 and 14 have different colors. As shown in FIG. 2, the top layer 12 is approximately ⅓ or less the total thickness. The underlying layer is the remaining ⅔ or more of the thickness of the tile board 10. For example, in one embodiment the top layer can have a thickness of 0.010" and the underlying layer can have 0.040" thickness. In another embodiment, the top layer can have a thickness of 0.030" and the underlying layer have a thickness of 0.625".

The tile board 10 then has a plurality of grooves 16 cut through the top layer 12 to divide the top layer into tile sized members 18. Each tile sized member 18 is surrounded by a plurality of grooves 16.

Figure 4:
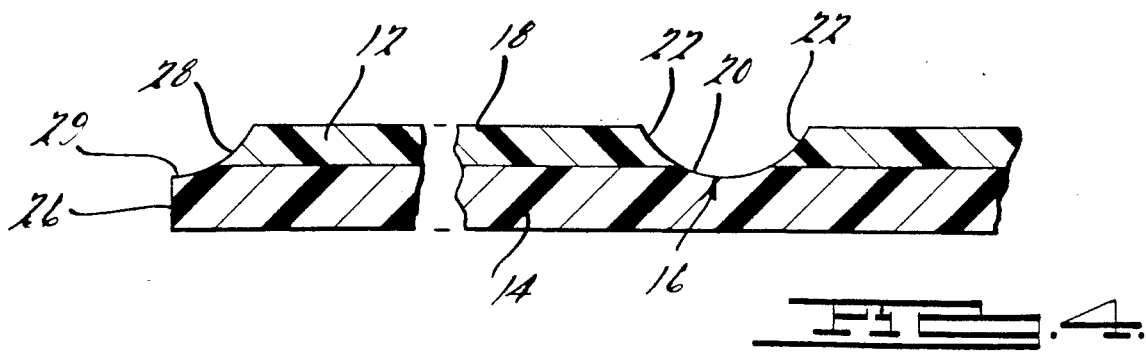
FIG. 4 is an enlarged fragmented cross-sectional view taken along lines 4—4 of FIG. 1.

As shown in FIG. 4, each groove 16 extends through the top layer 12 to expose strips 20 of the bottom layer 14. The bevel edges 22 of each tile sized member 18 are concave and form part of the grooves 16 to simulate beveled edges of a tile. The exposed strips 20 are also slightly concave such that they form a smooth continuum with the edges 22 and simulate a recessed grout line.

The groove width at the top of the top layer 12 indicated between numbers 23 is approximately twice the width of the groove at the top of the bottom layer 14 indicated between numbers 21 to give substantial width to the edges 22. More broadly, the groove width at the top of the top portion is visibly greater than the groove width at the top of the underlying portion. For example, the groove through a 0.01" thick top layer can be 5/12" to 7/32" wide with the grout line appearing to be less than ¾ of that width which leaves enough bevel edge 22 of the top layer to be visible to the naked eye.

Furthermore, in one embodiment the depth of the groove is substantially through the top layer 12 with a small amount of the groove depth being accounted for by the bottom layer 14. For example, in the embodiment with the 0.030" top layer, the groove can be 0.040" deep or extend 0.010" into the underlying layer. In thinner tile board, when the top layer is 0.010", the groove can be 0.021" deep or extend 0.011" into the underlying layer.

Figure 1:
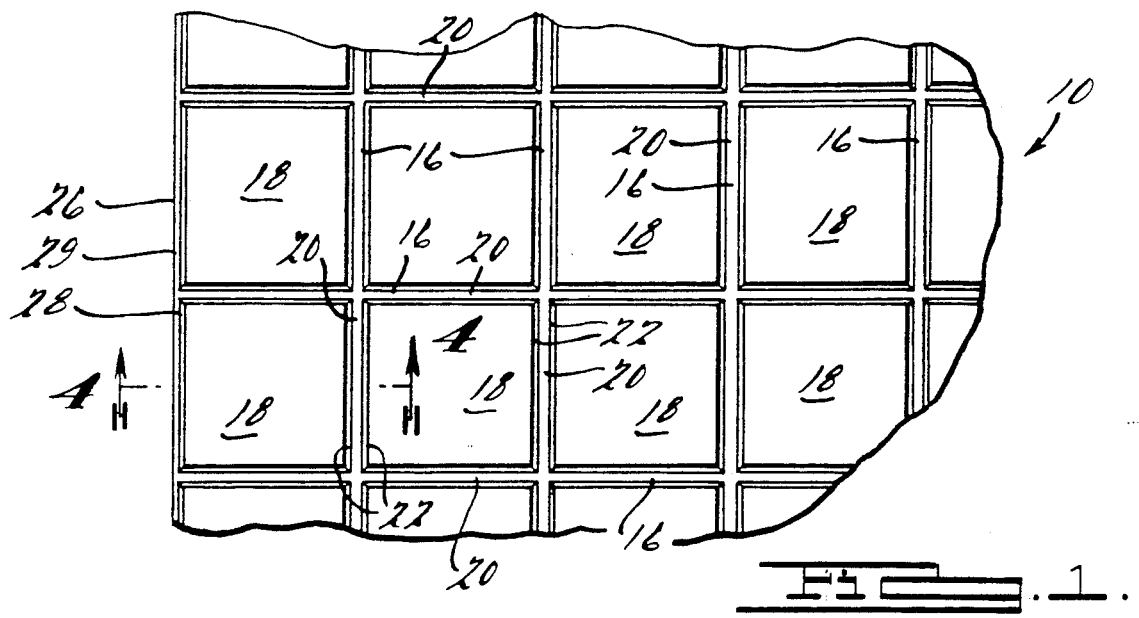
FIG. 1 is a fragmentary top plan view of a tile board according to the invention.

As shown in FIG. 1, preferably the edge 26 of the tile board 10 corresponds with a notch 28 and more particularly with the exposed strip 29 such that when two or more tile boards 10 abut each other, they abut each other such that adjacent notches 28 form a groove 16 and adjacent strips 29 form exposed strip 20.

Figure 3:
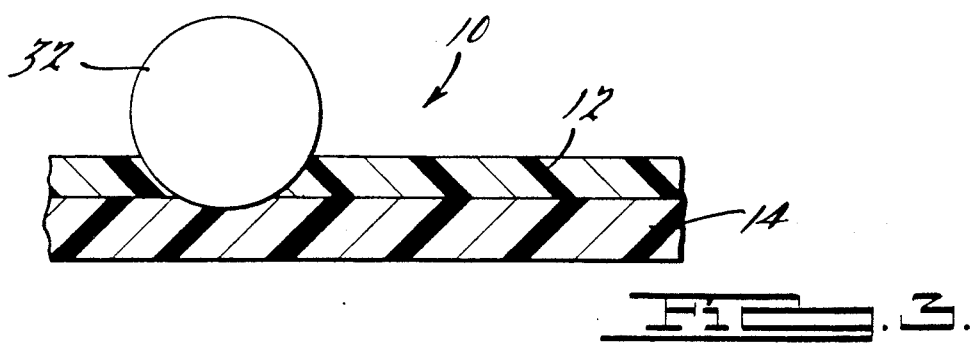
FIG. 3 is a view similar to FIG. 2 showing the groove being milled therein.

The tile board 10 is formed by machining the grooves through the top layer 12. As shown in FIG. 2, the tile board starts out as a multi-color uniformly thick plastic sheet. As shown in FIG. 3, a mill bit 32 is used to form grooves 16 having concave surfaces in cross-section. Each groove 16 is deep enough to cut completely through top layer 12 and expose strips 20 within layer 14. Each groove 16 slightly recesses into bottom layer 14. The grooves 16 also form edges 22 of the tile sized member 18. Alternatively, the top layer 12 can be routed, sawed, or sanded to expose strips 20 of the bottom layer 14 of contrasting color. After the grooves 16 are machined in, the exposed strips 20 of bottom layer 14 takes the appearance of grout lines and the milled top layer 12 form a plurality of tile sized members 18 that appear to be embedded within grout.

In the embodiment shown in FIGS. 5, 6 and 7, an additional layer 30 is simultaneously formed and homogeneously bonded and with the top tile layer 12a and underlying grout layer 14a to form a one piece tile board 10a. The additional layer 12a preferably has the same thickness and color of the top tile layer 12a so that it appears the underlying grout layer 14a is sandwiched therebetween. Further, additional layers can also be simultaneously formed and homogeneously bonded to layers 12a, 14a and 30.

In addition, the tile board 10a has a 90° bent edge section 32 so that the tile board can be fitted about an outer wall corner to give the board a more complete finished look.

The bent edge section 32 is formed by placing a tubular heater approximately ⅛" or so away from an edge 26a of a flat tile board behind additional layer 30 on the backside 33 and heating the rod to over 350° F. The flat tile board is then placed with the grout lines facing against a two part hinged plate with the hinge axis being aligned with the heated section 34. The flat major section 35 of the tile board is clamped in place against a first section of the hinged plate with an elongate clamp extending the length of the tile board placed within approximately ⅛" from the heated section 34. The second hinged plate section is free to pivot upwardly against unclamped section 32 to bend the section 32 approximately 90° from the plane of section 35. The tile board is released and section 34 is allowed to cool. The section 34 is approximately ½" wide.

Because there is no grout inserted between the tile sized members 18, there are minimal problems with mildew, chipping, cracking and other problems normally associated with grout.

In addition, because the tile board 10 is a solid piece of plastic, there are no problems with loosening tiles and no need for replacing any individual tiles. Cleaning of the tile board is easier because the tile and grout lines can be scrubbed without fear of loosening the grout or the tiles.

In addition, the tile board is manufactured without the necessity of laying the grout lines in between the simulated tiles. The machining of the sheet 10 simultaneously forms the tile sized members 18 and exposes strips 20 in the bottom layer 12 which simulate grout lines. A separate step in forming the contrasting colored grout lines 20 between the tile sized members 18 has been eliminated.

Furthermore, the machining of the grout lines to form grooves with its depth substantially in the top layer provides for an appearance of thickness of the tile sized components 18. Secondly, the simulated beveled edge 22 is provided by contouring the groove to be substantially wider at its top at numeral 23 than at the level indicated by numeral 21.

Furthermore, the bent edge section 32 provides for fitting tile board about an outer wall corner and gives a finished tile look to the wall.

Variations and modifications of the present invention are possible without departing from its spirit and scope as defined by the appended claims.

I claim:

1. A coextruded, grooved, plastic material tile board for bathrooms and kitchens simulating tiles embedded in grout comprising:
   a top layer of plastic material;
   an underlying layer of plastic material of different color, said top layer and underlying layer being integrally formed together by coextrusion and solidifying to form said tile board free from any separate adhesives therebetween;
   said top layer having grooves formed therethrough by selective mechanical removal of the top layer after it solidifies to expose strips of said underlying layer, said strips having a width and simulating grout lines;
   the groove having a total width that is visibly greater than said width of the exposed strips of said underlying layer; and
   said exposed strips visibly dividing said top layer into finished tile sized components simulating individual tiles.

2. A tile board as defined in claim 1 wherein said tile board has an edge section bent with respect to an adjoining section of said tile board to be able to span a corner of two adjacent walls.

3. A tile board as defined in claim 2 wherein said edge section is bent approximately 90° to the adjoining section.

4. A tile board as defined in claim 2 wherein said edge section is bent such that said tile board can span an outer corner of two adjacent walls with said simulated grout lines being exposed.

5. A tile board as defined in claim 1 wherein said top layer is thinner than said underlying layer.

6. A tile board as defined in claim 5 wherein said top layer comprises about ⅓ of the total thickness of the tile board and wherein said underlying layer comprises about ⅔ of the total thickness of the tile board.

7. A tile board as defined in claim 1 wherein the edges of said tile sized components of said top layer are beveled.

8. A coextruded, grooved, plastic tile board for bathrooms and kitchens simulating tiles embedded in grout produced by a process comprising:
   coextruding a top plastic layer and an underlying plastic layer forming a multi-layered plastic sheet;
   said top layer being visually identifiable from said underlying layer;
   forming grooves through said top layer by selectively removing the top layer to expose strips of said underlying layer, said strips having a width and simulating grout lines;
   the grooves having a width that is visibly greater than said width of the exposed strips of said underlying layer; and
   said exposed strips visibly dividing said top layer into tile sized components simulating individual tiles.

9. The tile board as defined in claim 8 wherein the edges of said tile sized components of said top layer are beveled.

10. A method of manufacturing a grooved, plastic tile board for bathrooms and kitchens simulating tiles embedded in grout comprising:
    producing a one piece multi-layered plastic sheet having a top plastic layer and an underlying plastic layer visually identifiable from said top layer by:
    simulating individual tiles by: form said multi-layer plastic sheet;
    said top layer being visually identifiable from said underlying layer; and
    said top layer forming grooves in having a width; and, exposing strips of said bottom layer; and forming tapered edges of said top layer, whereby said exposed strips simulate grout lines and visibly divide said top layer into tile sized components.

11. A method as defined in claim 10 further comprising:
    bending an edge section of said tile board such that said tile board when installed can span a corner of two adjacent walls.

12. A method as defined in claim 11 further comprising:
    heating a linear section of adjacent said edge section of said tile board such that said linear section becomes pliable before said bending said edge section.

* * * * *